US012567554B2

(12) United States Patent
Burnsed et al.

(10) Patent No.: US 12,567,554 B2
(45) Date of Patent: Mar. 3, 2026

(54) ELECTRO-OPTICAL SEMI-TRANSPARENT PHOTONIC UP-CONVERTER

(71) Applicant: L3Harris Technologies Inc., Melbourne, FL (US)

(72) Inventors: Jon D. Burnsed, Tempe, AZ (US); Jacob J. Becker, Gilbert, AZ (US); James A. LeBeau, Tempe, AZ (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 831 days.

(21) Appl. No.: 17/185,554

(22) Filed: Feb. 25, 2021

(65) Prior Publication Data

US 2022/0268697 A1     Aug. 25, 2022

(51) Int. Cl.
*H01J 31/50* (2006.01)
*G02B 23/12* (2006.01)

(52) U.S. Cl.
CPC ............ *H01J 31/50* (2013.01); *G02B 23/125* (2013.01); *H01J 2231/50005* (2013.01)

(58) Field of Classification Search
CPC ...................... H04N 23/11; H01J 31/50; H01J 2231/50005; H01J 2231/50015; G02B 23/125; G02B 23/12
See application file for complete search history.

(56) References Cited

U.S. PATENT DOCUMENTS 6,624,414 B1 * 9/2003 Glesener ................. H01J 31/50
313/527
8,304,728 B2 11/2012 So 10,763,092 B2 9/2020 Burnsed et al.
11,550,140 B2 1/2023 Becker et al.
2002/0125472 A1 * 9/2002 Johnson ................. B82Y 20/00
257/E31.067

(Continued)

FOREIGN PATENT DOCUMENTS

CN 110649083 A * 1/2020 ......... H01L 27/3227
CN 112310808 A * 2/2021
EP 3155668 B1 2/2021

OTHER PUBLICATIONS

Tanslation of CN-112310808-A (Year: 2021).*

(Continued)

*Primary Examiner* — Edwin C Gunberg
*Assistant Examiner* — Mamadou Faye
(74) *Attorney, Agent, or Firm* — NIXON & VANDERHYE P.C.

(57) ABSTRACT

A night vision optical device includes an underlying device configured to be sensitive to light in a first spectrum, and to provide output light based on absorbing light in the first spectrum. The night vision optical device further includes a stacked device overlapping the underlying device. The stacked device includes one or more openings formed in the stacked device to form one or more transparent regions which are transparent to the light in the first spectrum to allow light in the first spectrum to pass through to the underlying device. The stacked device is sensitive to light in a second spectrum. The stacked device outputs light in the first spectrum to the underlying device as a result of absorbing light in the second spectrum. Thus, the underlying device outputs light based both on light passing through the transparent regions and on light output by the stacked device.

14 Claims, 5 Drawing Sheets

608 606
610
612

602

(56) References Cited

U.S. PATENT DOCUMENTS

| | | | |
|---|---|---|---|
| 2006/0043373 A1* | 3/2006 | Wu | H10K 59/123 |
| | | | 257/72 |
| 2006/0237810 A1 | 10/2006 | Sand et al. | |
| 2008/0049159 A1 | 2/2008 | Tsaur et al. | |
| 2010/0084679 A1 | 4/2010 | Hsieh et al. | |
| 2013/0129349 A1* | 5/2013 | Maxik | H05B 45/24 |
| | | | 398/34 |
| 2013/0215496 A1* | 8/2013 | Ban | H01L 31/14 |
| | | | 359/345 |
| 2015/0008390 A1* | 1/2015 | Lewis | H10K 65/00 |
| | | | 438/24 |
| 2017/0094199 A1 | 3/2017 | Sarusi et al. | |
| 2017/0280067 A1* | 9/2017 | Mingus, III | H04N 23/11 |
| 2018/0356625 A1* | 12/2018 | Conley | H01L 31/1035 |
| 2019/0363069 A1* | 11/2019 | Ahmed | H10H 20/018 |
| 2019/0393271 A1* | 12/2019 | So | H10K 65/00 |
| 2020/0200873 A1* | 6/2020 | Schmidt | G01S 17/931 |
| 2020/0209708 A1* | 7/2020 | Neshev | G02F 1/353 |
| 2020/0400944 A1 | 12/2020 | Burnsed et al. | |
| 2021/0349301 A1 | 11/2021 | Becker et al. | |
| 2022/0057519 A1* | 2/2022 | Goldstein | G01S 17/04 |
| 2023/0085741 A1 | 3/2023 | Becker et al. | |

OTHER PUBLICATIONS

Translation of CN-110649083-A (Year: 2020).*
Notice of Allowance received for U.S. Appl. No. 16/868,306, mailed on Oct. 6, 2022, 3 pages.
Notice of Allowance received for U.S. Appl. No. 16/868,306, mailed on Sep. 23, 2022, 5 pages.
Non-Final Office Action received for U.S. Appl. No. 16/868,306, mailed on Jun. 7, 2022, 9 pages.
Search Report received for French Patent Application No. 2104393, mailed on Apr. 17, 2023, 6 pages.
Non-Final Office Action received for U.S. Appl. No. 17/987,157, mailed on Mar. 7, 2023, 11 pages.

* cited by examiner

↙ 100

| 106 | 106 | ↙ 104 |

102

↙ 200

| 204A | 206 | 204B | 206 | 204C |

202

↙ 300

306B ↙

↙ 304B 306A          306A

↙ 304A

302

ELECTRO-OPTICAL SEMI-TRANSPARENT PHOTONIC UP-CONVERTER

BACKGROUND

Background and Relevant Art

Night vision systems allow a user to see in low-light environments without external human visible illumination. This allows for covert vision in a low-light environment to prevent flooding the environment with human visible light and/or protects the user from being detected due to causing human visible light or light that is otherwise detectable to other night vision systems to be emitted.

Currently, there are two different general classes of night vision systems: analog and digital. Analog systems function by receiving low levels of light reflected off of, or emitted from objects and providing that light to an image intensifier (sometimes referred to as $I^2$). The image intensifier has a photocathode. When photons strike the photocathode, electrons are emitted through a vacuum tube, and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber optic, to an eyepiece where the user can view the illuminated phosphor screen, thus allowing the user to see the objects. Note that analog systems typically amplify very low levels of light in the visible spectrum, which is about 380 nm to 750 nm. Note that these analog systems can typically detect and create a viewable representation of light in the near infrared (NIR) spectrum as well, which is light that is less than about 900 nm.

Digital night vision systems function by directing light to a sensor pixel array to detect the light, such as CCD or CMOS, and then processing this information before outputting images to a display for the user to view the detected images. Often, digital night vision systems require the use of external illumination using light outside of the human visible spectrum.

There are a number of specialized night vision systems specially made for other wavelength ranges, such as systems made for short wave infrared (SWIR) light in the 0.9-1.7 um or 1.7-3.0 um wavelength range, medium wavelength infrared (MWIR) in the 3-5 um wavelength range, or long wavelength infrared (LWIR) in the 8-12 um wavelength range. Indeed, some specialized systems are specifically required to have sensitivity to the 1.55 um wavelength specifically, or other specific and specialized wavelengths.

Notably, night vision systems have been designed based on specific technologies, and have been designed for particular wavelengths or wavelength ranges. To the extent that technologies and/or wavelengths are mixed, they can be more properly imagined as disparate systems where different outputs are displayed at different times to the user. Even when systems display different outputs at the same time to the user, this is typically done by merging the outputs which can result in a disjointed and jarring output from the user perspective. For example, one popular system captures visible spectrum light using one set of sensors and outputs an image, while using other sensors to capture infrared light and output and infrared image, and then superimposing either the visible light-based image or the infrared light-based image on the other image. If the sensors are even slightly out of alignment, which is typically guaranteed based on sensor positioning, then there will be some disparity between the various images due to parallax effects.

Further, different night vision systems have different latencies. This results in further jarring effects when different night vision systems are used together as motion will be rendered different by different system, resulting in a disjointed presentation of motion of objects in an environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a night vision optical device. The night vision optical device includes an underlying device configured to be sensitive to light in a first spectrum, and to provide output light based on absorbing light in the first spectrum. The night vision optical device further includes a stacked device coupled in an overlapping fashion to the underlying device. The stacked device includes one or more openings formed in the stacked device to form one or more transparent regions which are transparent to the light in the first spectrum to allow light in the first spectrum to pass through to the underlying device. The stacked device is sensitive to light in a second spectrum. The stacked device outputs light in the first spectrum to the underlying device as a result of absorbing light in the second spectrum. Thus, the underlying device outputs light based both on light in the first spectrum passing through the transparent regions and based on light in the first spectrum output by the stacked device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figures 1, 2, 3:
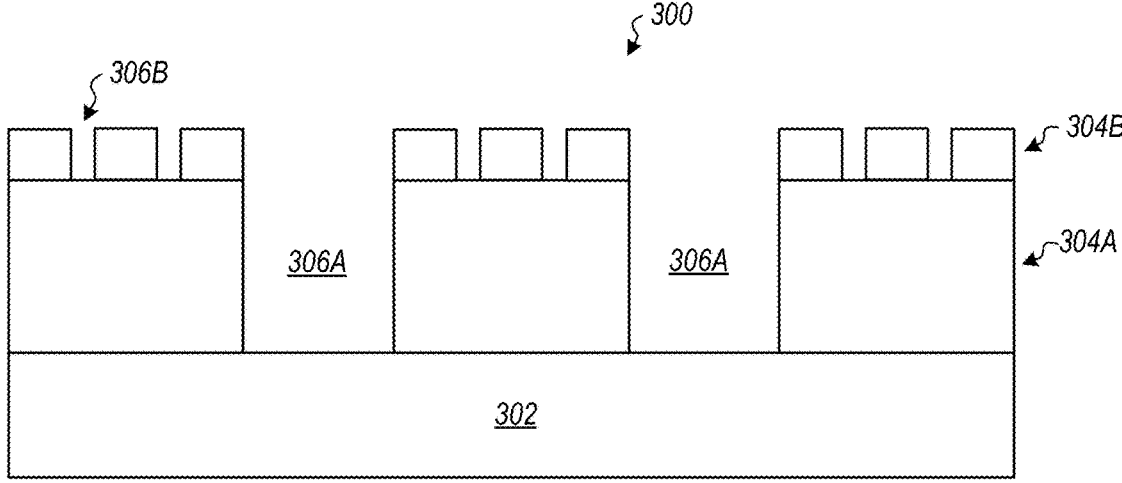
FIG. 1 illustrates an example composite device including an underlying device and a stacked device.
FIG. 2 illustrates an example composite device including an underlying device and a plurality of stacked devices.
FIG. 3 illustrates an example composite device including an underlying device and a plurality of stacked devices.

Embodiments illustrated herein are directed to composite devices having extended light wavelength sensitivity manufactured by serially stacking one or more different wavelength spectrum device(s) (referred to herein as stacked device(s)) onto an underlying device, sometimes referred to herein as a primary device, and where one or more of the stacked device(s) include transparent openings, illustrated herein as trenches, allowing light to pass directly through the transparent trenches to the underlying device. That is, the underlying device comprises a primary detector that is sensitive to a first wavelength spectrum. The stacked device(s) have detectors that are sensitive to wavelength spectrums (typically different than the underlying device), and are configured to up-convert received light to the first wavelength spectrum. The stacked device(s) are further configured to output up-converted light (in the first wavelength spectrum) to the underlying device.

As used herein, up-convert refers to the energy in the light, which has an inverse relationship to light wavelength. Thus, for example, energy could be increased for medium wave infrared light (having a wavelength not visible by humans) input into a device to cause an output of visible light from the device by up-converting the energy in the light. This is typically done by using lower energy (i.e., longer wavelength) absorbed light to produce electrons and using the produced electrons to produce higher energy (i.e., shorter wavelength) output light.

Thus, the underlying device receives light in the first wavelength spectrum through the transparent trenches. The underlying device also receives up-converted light from the stacked device(s) in the first wavelength spectrum. Output from the underlying device is thus a result of both naturally occurring light received in the first wavelength spectrum as well as up-converted light, up-converted from the different wavelength spectrums to the first wavelength spectrum, from the stacked device(s). As noted previously, the stacked device(s) are sensitive to other wavelength spectrums, which the underlying device may not be natively sensitive to. This allows for implementation of a composite device with extended wavelength sensitivity as compared to previous devices.

Note that while stacked devices may inherently be somewhat transparent to the first wavelength spectrum, embodiments herein can address scenarios when the stacked devices are not transparent to the first wavelength spectrum, or are less transparent to the first wavelength spectrum than is desired. Thus, embodiments herein can create transparency or increase transparency by including transparent regions in the stacked devices.

Note that by inputting up-converted light into the underlying device, several advantages can be achieved. In particular, light from different spectrums can be used to construct an output image in a same focal plane. Further output caused from different spectrums can be aligned axially due to the stacking configuration.

Referring now to FIG. 1, an example is illustrated. FIG. 1 illustrates a composite device 100 having extended light wavelength sensitivity. In the example illustrated in FIG. 1, an underlying device 102 is illustrated. The underlying device 102 has sensitivity to light in a given primary spectrum. For example, the underlying device may be a device that is sensitive to light in the visible spectrum (i.e., about 380 nm to 750 nm), while being less sensitive, or not sensitive at all, to light in other spectrums. For example, in some embodiments, the underlying device 102 may be a night vision system based on analog technology such as image intensifier technology, digital technology such as visible spectrum CMOS technology, CCD, or similar technology.

FIG. 1 further illustrates that a stacked device 104 is implemented on the underlying device 102. In the example illustrated in FIG. 1, the stacked device 104 has a number of transparent regions 106. In particular, the transparent regions 106 are transparent to the primary spectrum to which the underlying device 102 is sensitive. In some embodiments, the transparent regions 106 are formed by forming trenches in the stacked device 104. The transparent regions 106 may have various materials therein, or in some embodiments, no material at all such as when the stacked device 104 is implemented in a vacuum sealed environment. One example of implementation in a vacuum sealed environment is when the stacked device 104 is formed as part of the epitaxial structure of a GaAs image intensifier tube. Thus, the transparent regions 106 may be filled with air, silicon dioxide, other oxide materials, etc., or no materials at all. In any case, the transparent regions are transparent to a spectrum to which the underlying device 102 is sensitive. Note that while the transparent regions are described as being transparent, in some embodiments, this may mean that the transparent regions are semi-transparent to the spectrum. For example, in some embodiments, certain filtering materials can be used to filter certain spectral components. This can be done to allow for colorized night vision by creating color sensitive elements. Alternatively or additionally, embodiments may use spectral filtering to color IR bands according to some predetermined coloring scheme.

The stacked device 104 has sensitivity to light in a second and typically different spectrum (although the spectrums for the stacked device 104 and the underlying device 102 may overlap) than the underlying device 102. That is, the stacked device 104 is typically sensitive to wavelengths of light which the underlying device 102 is not sensitive to. However, some embodiments may be implemented where the underlying device and stacked device have significant overlap in spectrum sensitivity so as to accomplish certain specialized functionality. As will be illustrated in more detail below, the stacked device 104 will receive light input in the secondary spectrum and output light in the primary spectrum to the underlying device 102. Thus, in this example, the underlying device 102 will receive light in the primary spectrum from the environment in which the composite device 100 is implemented through the transparent regions 106, as well as receiving light in the primary spectrum from the stacked device 104, which receives light in the secondary spectrum, and as a result outputs light in the primary spectrum to the underlying device 102. In this way, a composite device 100 that is sensitive to an extended spectrum with respect to the underlying device 102 can be implemented. The composite device 100 produces an output familiar to the underlying device 102, but being based on both environmental input in the primary spectrum as well as environmental input in the secondary spectrum.

Various alternative configurations may be implemented. For example, FIG. 2 illustrates a composite device 200. In this example a plurality of stacked devices including stacked device 204A, 204B, and 204C are implemented on the underlying device 202. Each of the different stacked devices 204A, 204B, and 204C, may be sensitive to additional spectrums of light. Further, each of the stacked devices 204A, 204B, and 204C, may be configured to receive light input in their respective spectrums and to output light in a primary spectrum to which the underlying device 202 is sensitive.

Again, as illustrated in FIG. 1, the composite device 200 of FIG. 2 includes a plurality of transparent regions 206. The transparent regions 206 are formed by including trenches and potentially filler material as described above in conjunction with the description of FIG. 1 such that the transparent regions 106 are transparent to the primary spectrum.

In this way, a composite device 200 can be implemented with even further additional spectrum sensitivity that is sensitive to light in the primary spectrum as well as a spectrum for stacked device 204A, a spectrum for device 204B, and a spectrum for device 204C. In particular, the underlying device 202 receives light in the primary spectrum through the transparent regions 206, as well as up-converted light converted from their respective spectrums to the primary spectrum from the stacked devices 204A, 204B, and 204C. Note that it should be appreciated that various configurations can be implemented within the spirit of the embodiments illustrated in FIG. 2. For example, the structures illustrated in FIG. 2, and in particular the stacked devices, can be repeated in various arrays. Alternatively or additionally, individual groupings can be arranged in different ways. For example, embodiments may be implemented in RGB sub-pixel layouts within an overall pixel.

Referring now to FIG. 3, an additional alternative embodiment is illustrated. In this example, the underlying device 302 is illustrated in a fashion similar to the underlying devices illustrated in FIG. 1 and FIG. 2. The underlying device 302 is sensitive to light in a primary spectrum. A first stacked device 304A is implemented in a fashion similar to that illustrated in FIG. 1 for the stacked device 104. This allows light in the primary spectrum to be received through transparent regions 306A from the native environment. In this example, the stacked device 304A is sensitive to a second spectrum of light. Further, the stacked device 304A is configured to up-convert light from the second spectrum to light in the primary spectrum, and to output the light in the primary spectrum to the underlying device 302.

FIG. 3 further illustrates a second stacked device 304B stacked on the first stacked device 304A. The second stacked device 304B is sensitive to a third spectrum of light. The second stacked device 304B also has transparent regions 306B. The transparent regions 306B are transparent to light in the second spectrum so as to allow light in the second spectrum in the native environment to be received by the first stacked device 304A through the transparent regions 306B. The second stacked device 304B is configured to receive light in the third spectrum and to up-convert the light to light in the second spectrum. In this way, the composite device 300 has an extended spectrum sensitivity as compared to the underlying device 302 in that the composite device 300 has spectrum sensitivity due to the underlying device 302, the stacked device 304A, and the stacked device 304B.

Figure 4:
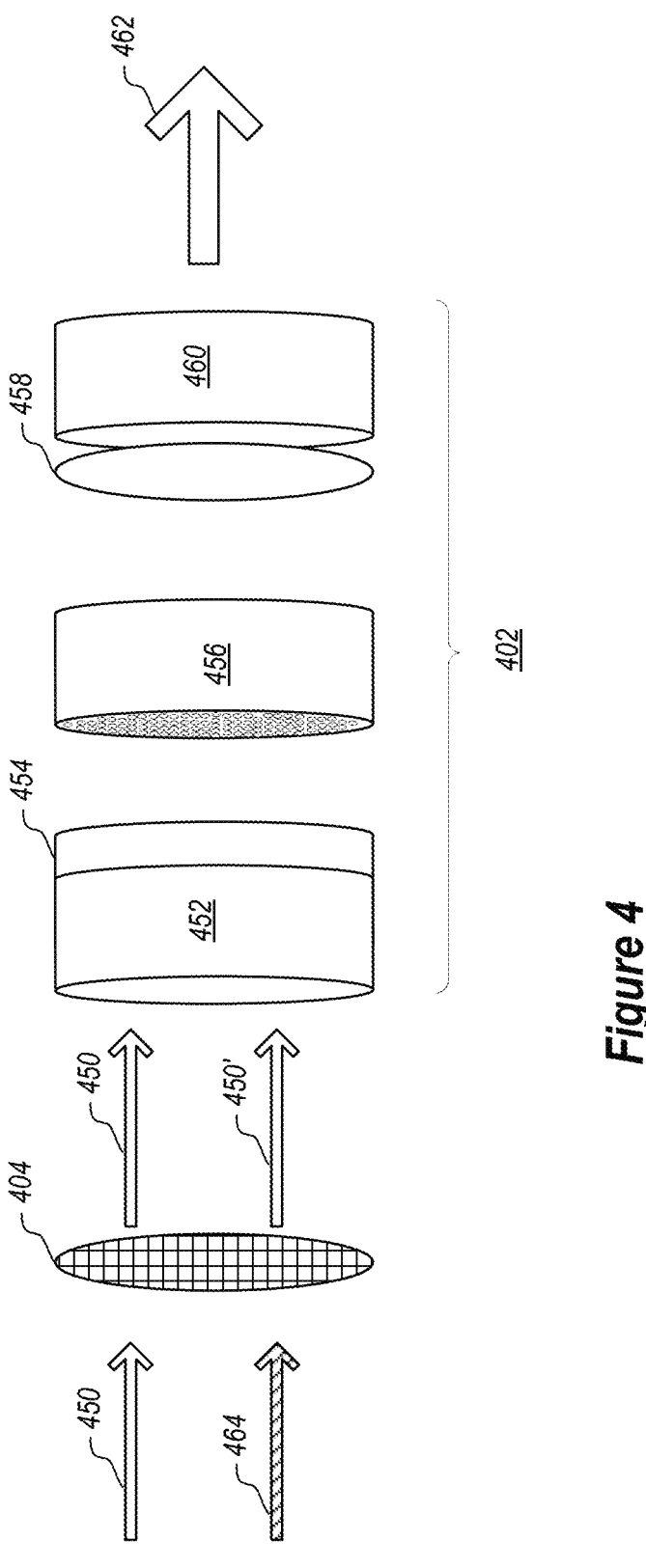
FIG. 4 illustrates an example composite device including an underlying device based on intensifier tube technology and a stacked device.

Referring now to FIG. 4, a particular example is illustrated. The example illustrated in FIG. 4 is based on image intensifier technology commonly found in analog night vision systems. FIG. 4 illustrates a composite device 400. The composite device includes an underlying device 402. In this example, the underlying device is an image intensifier. An image intensifier, such as the underlying device 402, may include functionality for amplifying light received from an objective of a night vision system to create a sufficiently strong image that can be viewed by the user. This may be accomplished using various technologies such as a photocathode 454, a microchannel plate 456, and a phosphor screen 458. The photocathode 454 may be configured to generate photo electrons in response to incoming photons.

FIG. 4 further illustrates a stacked device 404, which in this case is a photon up-converter film which is transparent to light 450 which is in a primary spectrum, which in this case is the visible light spectrum. Thus, as illustrated in FIG. 4, light 450 can pass through the stacked device 404, through the transparent regions, to the underlying device 402. In particular, the light 450 will be received by an optic 452, such as a fiber-optic faceplate (which allows for the stacked device 404 and the photocathode 454 to be at the same focal plane of whatever objective is used to focus the image on the device), which will direct the light into a photocathode 454. Note this this example simply illustrates one embodiment. Other embodiments could implement different lenses and different focal planes, depending on the embodiment. The photocathode 454 produces electrons when photons strike the photocathode and directs the electrons into a microchannel plate 456. Electrons are multiplied in the microchannel plate 456. Electrons are emitted from the microchannel plate 456 to a phosphor screen 458 which glows as a result of electrons striking the phosphor screen 458. This creates an image from the input light 450.

A fiber-optic 460 carries this image as intensified light 462 to the eyepiece of a night vision system where it can be output to the user.

Light 464 in a second spectrum is received by the stacked device 404 and converted to light 450' in the primary spectrum as illustrated in FIG. 4. Note that while light 450 and 450' are designated by slightly different designators, it should be appreciated that both of these instances of light are in the primary spectrum. The prime designation is simply included to illustrate that that portion of the light in the primary spectrum was produced from up-converting light 464 in a second spectrum by the stacked device 404. The light 450' is processed by the underlying device 402 in the same fashion as the light 450, thus producing intensified light 462 that is produced based on light 450 in the primary spectrum and light 464 in a second spectrum.

Figure 5:
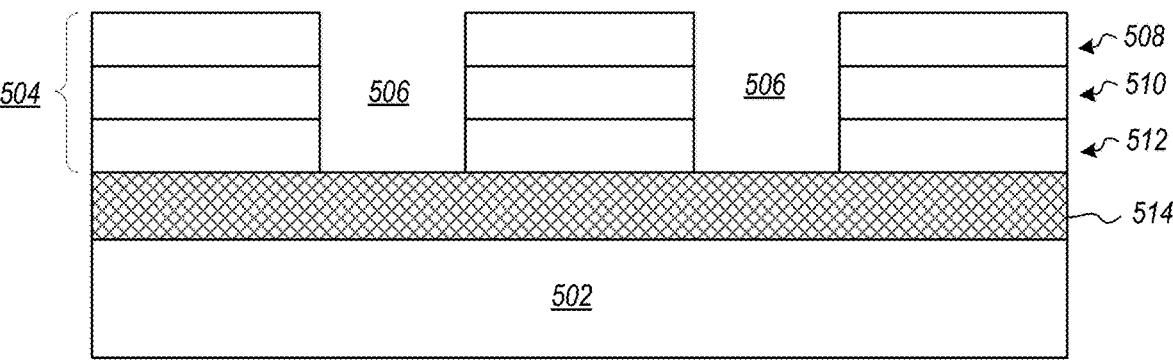
FIG. 5 illustrates an example composite device including an underlying device and a stacked device having collector, transport, and emitter layers.

Referring now to FIG. 5, additional details are illustrated. FIG. 5 illustrates a composite device 500, comprising an underlying device 502 and a stacked device 504. In this example, the stacked device 504 includes the transparent regions 506 formed by forming trenches in the stacked device 504. Additionally, FIG. 5 illustrates that the stacked device includes three layers including a collector layer 508, a transport layer 510, and an emitter layer 512. Functionally, the collector layer 508 absorbs light in the spectrum for which the stacked device 504 is sensitive. The collector layer further converts this light into an electrical signal, provided through the transport layer 510 to drive the emitter layer 512 to cause light in the primary spectrum (of which the underlying device is sensitive) to be emitted into the primary device 502 through an optical layer 514.

Thus, for example, embodiments insert a partially-transparent device (the stacked device 504) that will absorb light in a particular spectrum, such as short wave infrared (SWIR), medium wave infrared (MWIR) and/or long wave infrared (LWIR). The stacked device 504 will convert this light to an electrical signal in the collector layer 508, and then use that current, provided through the transport layer 510, to drive one or more light emitters in the emitter layer 512 that operate in the visible (or potentially the NIR) spectrum. The light from the emitter layer 512 (which is in a spectrum to which the underlying device 502 is sensitive) is input, via an optical layer 514 into the underlying device 502 so that 'standard' detector devices like silicon detectors, GaAs image intensifier tubes, CMOS detectors, or any similar imaging device can output an image based on the light absorbed by the stacked device 504. The composite device 500 is then able to simultaneously 'see' the 'normal' VIS/NIR spectrum of the base imager of the underlying device 502 in addition to a separate spectrum (e.g., SWIR, MWIR, LWIR, etc.).

The following now illustrates some additional details with respect to the various components illustrated in FIG. 5.

The optical layer 514 may be implemented in a number of different fashions. For example, in some embodiments, the optical layer 514 may include a lenslet array. Alternatively or in addition, the optical layer 514 may include a fiber optic array. Alternatively or in addition, the optical layer 514 may include a relay lens. Alternatively or in addition, the optical layer 514 may include planar optics. Alternatively or in addition, the optical layer 514 may include multiple image planes. Providing output from the stacked device into a fiber-optic of the optical layer 514 may be done to make output from the stacked device 504 co-planar with output from the underlying device 502. The collector layer 508 may be implemented in a number of different fashions. For example, the collector 508 layer may be implemented using metamaterial plasmonic arrays (e.g., in a HEPD (hot electron photo detector)). This can be particularly useful for reducing thermal generation produced by the collector layer, and thereby reducing or eliminating dark current impact that may be experienced when using other materials. This may further reduce the need for cooling typically needed for semiconductor devices. Alternatively or in addition, the collector layer may be implemented using an Inorganic detector. Alternatively or in addition, the collector layer 508 may be implemented using group III-V, IV, and/or II-VI semiconductor materials, or combinations thereof. For example, some embodiments could implement a multi-junction SWIR detector. Such a detector could be implemented using group IV, III-V, and II-VI semiconductor materials. Alternatively or in addition, the collector layer 508 may be implemented using organic photodiodes. Alternatively or in addition, the collector layer 508 may be implemented using a-Si or VOx array with ROIC which can generate a same signal that can be coupled to an OLED or other LED emitter array in the emitter layer 512. Alternatively or in addition, the collector layer 508 may be implemented using graphene. Embodiments of the collector layer 508 can be implemented using a stack of multiple OLED photodiodes, quantum dots, or graphene. Note that the components in the collector layer could be forward or reversed biased depending on desired functionality and use. For example, as noted above, reverse biasing may allow for the collector layer to be used as a power source for the emitter layer while forward biasing may allow for control of electron production. Alternatively or in addition, the collector layer 508 (and portions of the transport layer 510) may be implemented using a phonon-assisted cycling excitation process (CEP). This particular process may be used to improve noise performance and amplification functionality. Such systems are described in United States Patent Publication US20190363213, titled "Systems, Devices And Methods For Amplification Of Signals Based On A Cycling Excitation Process In Disordered Materials", which is incorporated herein by reference in its entirety.

The emitter layer 512 may be implemented in a number of different fashions. For example, the emitter layer 512 may be implemented using OLED technology, which may have superior index matching as compared to other technologies. Note that for intensifier tube embodiments, visible and/or NIR emission spectrum devices would be suitable. Thus, components could be selected based on efficiency rather than based on selecting particular wavelengths of light. Alternatively or in addition, the emitter layer 512 may be implemented using inorganic technologies such as AlGaAs, InGaAsP, GaAsP, QW/QD, or one or more of a number of other technologies.

In some embodiments, the transport layer 510 could include one or more of a number of different types of circuits. For example, in some embodiments, the transport layer could simply be metallization components that transport electrons from the collector layer 508 directly to the emitter layer 512 to allow emitters in the emitter layer 512 to emit light based directly on electrons generated from collectors in the collector layer 508 without additional manipulation of those electrons. Similarly, in some embodiments, the transport layer 510 may include conductive silicon to directly transport electrons, produced by the collector layer 508 absorbing light, to the emitter layer 512.

In alternative examples, the transport layer 510 may include additional circuitry such as amplifiers or other circuitry that is configured to adjust the amount of current provided to the emitter layer 512. In some embodiments, the amount of amplification or attenuation caused by the transport layer 510 using active circuits can be controllable using conventional amplifier gain techniques so as to allow for adjustments in contrast between portions of the image produced at the underlying device 502 due to light being absorbed by the stacked device 504 as compared to light absorbed directly at the underlying device 502. This can be done for example to enhance certain spectrum information. Alternatively or in addition, this can be done to reduce and prevent output from the stacked device 504 from causing a washed-out signal output from the primary device 502 as a result of excessive light produced at the emitter layer 512.

Thus, some embodiments may be able to have a controllable ratio between portions of an output image attributable to a primary spectrum due to native environment light being absorbed by the underlying device 502 and portions of the output image attributable to light being absorbed by the stacked device 504. For example, in some embodiments, the transport layer can include circuitry that is controllable to control current levels so as to control the brightness output by the emitter layer 512.

In some embodiments, a self-powered stacked device may be implemented, which produces power as a result of photons being absorbed by the collector layer 508, where the power can be used to drive the emitter layer 512 so as to implement more compact circuitry. In an alternative embodiment, the emitters in the emitter layer 512 may be externally biased to control output intensity of the emitters in the emitter layer 512.

Referring now to FIGS. 6A-6F, a number of alternative examples are illustrated. The figures illustrate that various combinations can be used for the transparent regions 606.

Figures 6A, 6B, 6C, 6D, 6E, 6F:
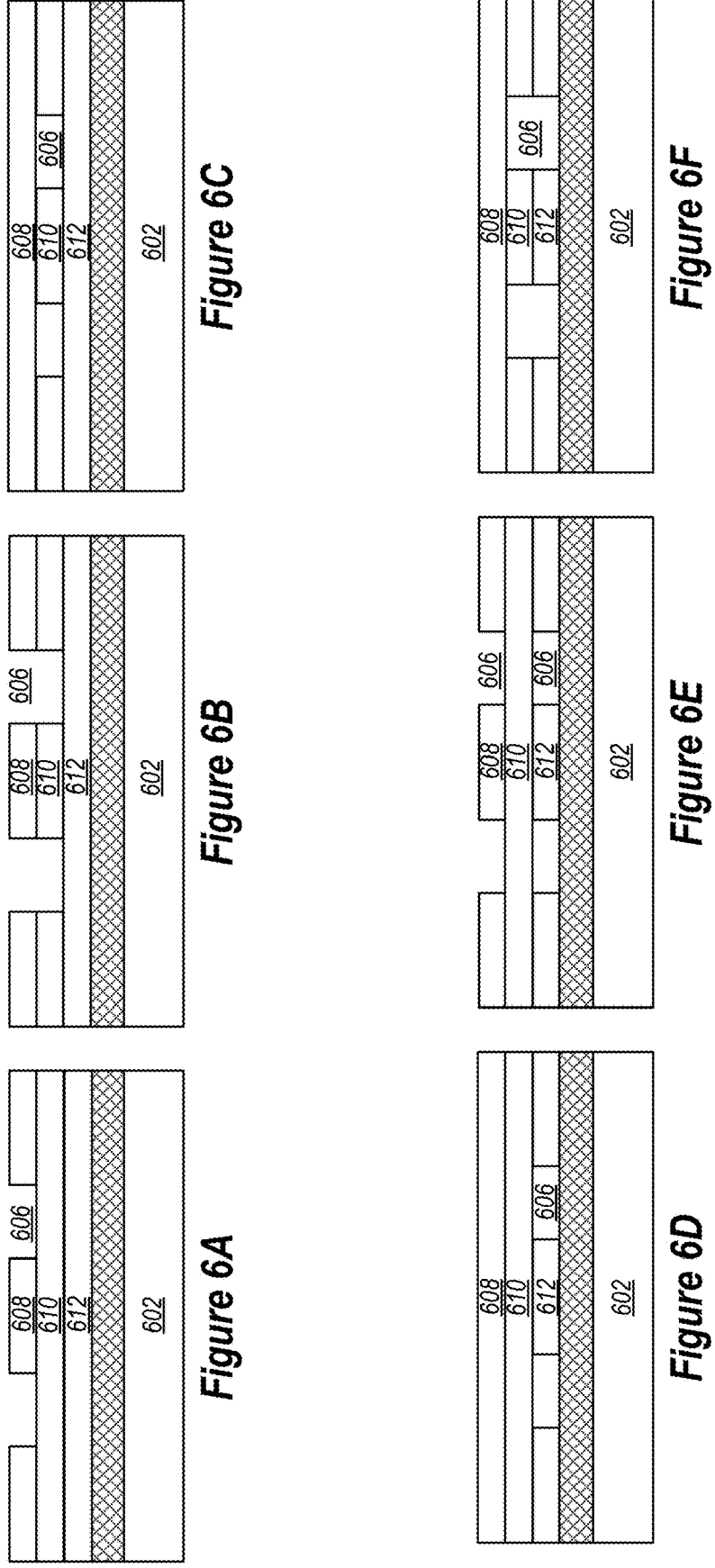
FIGS. 6A-6F illustrate various example composite devices with transparent regions in various locations.

For example, in FIG. 6A, the transparent regions can be formed in the collector layer 608 by forming a trench in the collector layer 608, while not forming trenches in the transport layer 610 and the emitter layer 612. This may be done, for example, when the transport layer 610 and emitter layer 612 are already somewhat transparent to light in the spectrum to which the underlying device 602 is sensitive. For example, the emitter layer 612 will often output light in a spectrum within the appropriate spectrum for the underlying device 602 sensitivity indicating that the emitter layer 612 is already transparent to the spectrum for the underlying device 602.

In FIG. 6B, the transparent regions 606 can be formed in the collector layer 608 and the transport layer 610. Again, as discussed above, the emitter layer 612 may already be appropriately transparent with respect to the spectrum of light for the underlying device 602.

In FIG. 6C, the transparent regions 606 can be formed in the transport layer 610. In this example, the collector layer and the emitter layer may already be appropriately transparent with respect to the spectrum of light appropriate for the underlying device 602. For example, this may occur when the collector layer 608 and the emitter layer 612 are constructed from organic LED (OLED) technologies, when the underlying device 602 is sensitive to light in the visible spectrum.

In FIG. 6D, the transparent regions 606 can be formed in the emitter layer 612. In this example, the collector layer 608 and transport layer 610 may already be sufficiently transparent with respect to the spectrum appropriate for the underlying device 602.

In FIG. 6E, the transparent regions 606 can be formed in the collector layer 608 and the transport layer 610. In this example, the transport layer 610 may already be sufficiently transparent with respect to the spectrum appropriate for the underlying device 602.

In FIG. 6F, the transparent regions 606 can be formed in the transport layer 610 and the emitter layer 612. Again, as alluded to above, in some embodiments the collector layer 608 may be transparent to light in the spectrum appropriate for the underlying device 602.

Figure 7:
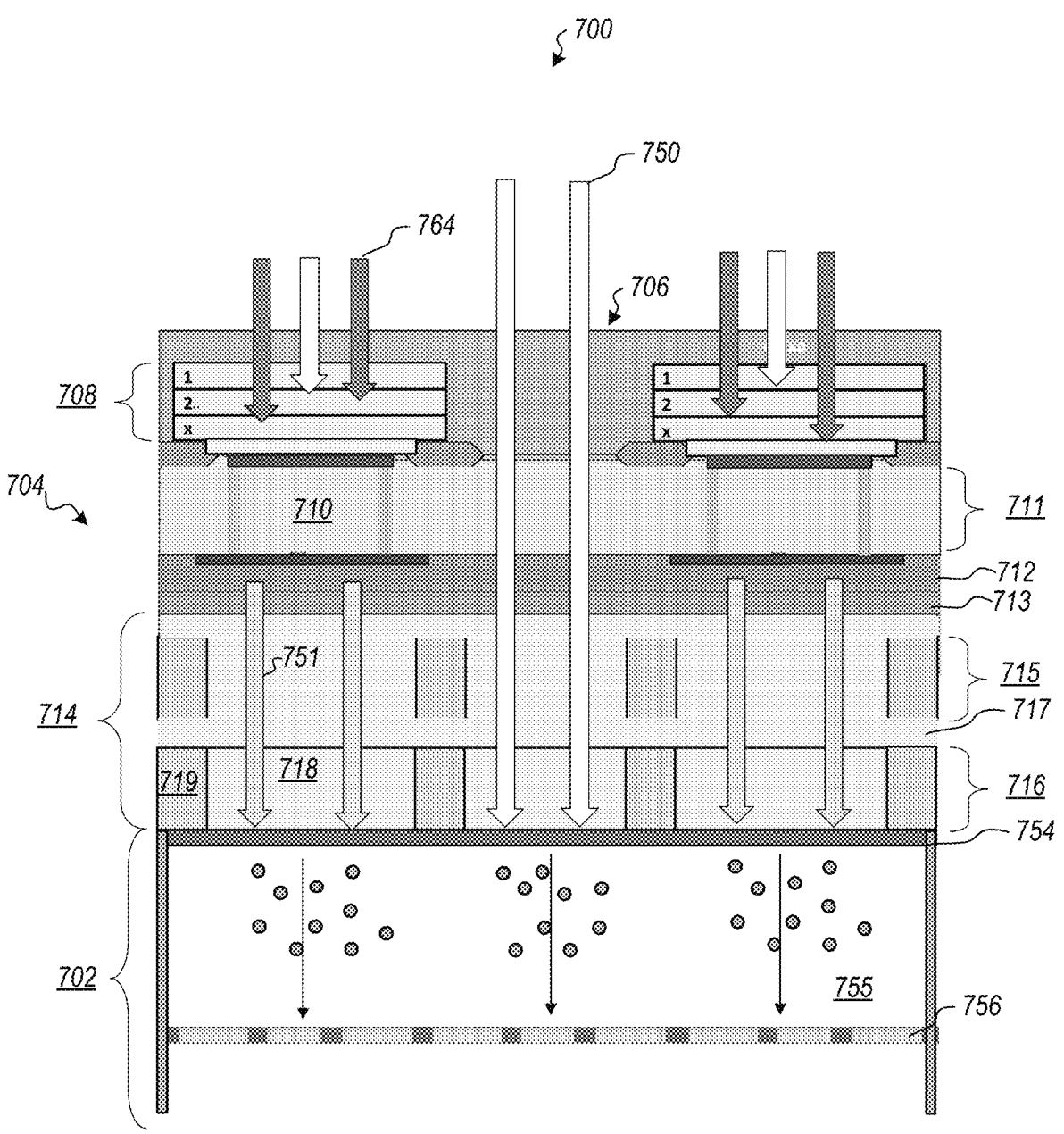
FIG. 7 illustrates a detailed example of a composite device including an underlying device and a stacked device.

Referring now to FIG. 7, an example is illustrated of a composite device 700 with additional details of the stacked device 704. The composite device 700 includes an underlying device 702 (which is only partially shown in this figure) and a stacked device 704. In the example illustrated, the underlying device 702 is an intensifier tube based device including a gallium arsenide photocathode 754, free electrons in a vacuum 755 that have been emitted following absorption of light by the photocathode, a microchannel plate 756, and a phosphorous screen (not shown, but an example is illustrated in FIG. 4).

The stacked device 704 is shown including a collector layer 708 which in this example is a multi-junction SWIR detector as discussed above. FIG. 7 further illustrates a transport layer 710 which in this example is formed through an oxide cap 711 using metallization through the oxide cap. FIG. 7 further illustrates an emitter later 712, which in this example is a near infrared OLED stack emitting light in the 700 to 800 nm bandwidth spectrum. FIG. 7 further illustrates an optical layer 714. An index matching adhesive 713 is used to bond the stacked device 704 to the optical layer 714. The optical layer 714 includes a fiber-optic substrate 715, a fiber-optic faceplate 716, and an index matching adhesive 717. The optical layer is further shown with sections of core glass 718 and sections of clad glass 719. FIG. 7 further illustrates a transparent region 706 which allows light 750 to pass through the various layers as described above to the underlying device 702. FIG. 7 further illustrates light 764 which is absorbed by the collector layer 708 to produce electrons which are transported by the transport layer 710 to the emitter layer 712 where light 751 is emitted and provided to the underlying device 702 as shown in FIG. 7. Note that in this example, the light 751 is near infrared light emitted by the emitters in the emitter layer 712. This is acceptable inasmuch as the underlying device 702 is able to detect photons in this bandwidth as well for providing output at the phosphor screen.

The transparent regions shown in the preceding figures can be created in a number of particular ways. In some embodiments, the transparent regions can be created by using the processes described in U.S. patent application Ser. No. 16/686,306 titled "Backside Etch Process For Transparent Silicon Oxide Technology", which is incorporated herein by reference in its entirety. Briefly, that application describes a process for creating transparent regions in otherwise opaque portions of semiconductor materials.

For example, devices may have active silicon islands which include transistors such as transistor to control devices such OLEDs in OLED stacks 454. Light must be transmitted through the silicon islands to the underlying device. However, as discussed previously, silicon will block light. This could be at least somewhat mitigated by including oxide trenches also separating active silicon islands from each other. The oxide trenches and buried oxide allow incoming light to pass through to the various inter-metal and dielectric layers, the OLED stack, and through a transparent cover, which may be a type of glass. However, nonetheless, some of the incoming light will be blocked by the non-active silicon islands.

Thus, embodiments can remove silicon between the active silicon islands to allow for more light to be transmitted through the stacked devices.

In particular, active silicon islands are separated from each other by space created by non-active silicon islands and oxide trenches having been removed. This allows the incoming light to pass through an optional transparent backfill material, potentially a portion of buried oxide, through various dielectric layers, through the OLED stack, and through a cover glass attached to the OLED stack. The incoming light allowed to pass through these various layers of the collector layer, transport layer, and/or emitter layer can be transmitted to the underlying device.

Note that some of the incoming light will continue to be blocked by the active silicon islands and metal interconnects. Further, some non-active silicon islands may be allowed to remain in the stacked device under metal trace portions of the stacked device to provide support for those metal trace portions.

However, transmission of light through the stacked device is nonetheless increased by removing portions of silicon that are not needed for implementing active electrical components or for supporting metal traces. For example, consider an example where dynamic pixel cells are used. In this particular example, there are two sub pixels per pixel. Anode size for the sub pixels is 8 μm×5.1 μm. Pixel area is 10.1 μm×12.4 μm. Pixel size is 22.5 μm×22.5 μm. This provides a resolution of 800×800. In this particular stacked device, if the non-active silicon islands are not removed, transparency of the stacked device is about 33%. In contrast, transparency is about 61% if the non-active silicon islands are removed.

Thus, in this example, transparency of a stacked device is increased by more than 80% by removing silicon and/or oxide trenches.

Note that various engineering trade-offs can be made to meet certain requirements. For example, increased transparency can be obtained by having a lower resolution and/or using fewer sub pixels as there is more space between pixels and/or sub pixels. If a higher resolution is needed, then that stacked device will have a lower transparency than an equivalently sized stacked device with a lower resolution. Thus, for example, a stacked device with a 36 μm pitch can obtain a transparency of 81%, while a stacked device of 22.5 μm pitch can obtain a transparency of 67%, while a stacked device having a 17.5 μm pitch will be about 55% transparency when non-active silicon islands are removed from the stacked device in each of the illustrated examples. Thus, some embodiments may be able to create a stacked device with at least a 36 μm pitch with at least a transparency of 75%, or a stacked device of at least a 22.5 μm pitch with at least a transparency of 60%, or a stacked device having at least a 17.5 μm pitch with at least a 50% transparency when silicon is removed between active silicon areas. The preceding illustrates one specific example related to a particular manufacturing process.

Pitch and transparency values will be specific to a given semiconductor manufacturing process—also known as the technology or process node—and will of course vary as the node changes. Typically designating the process's minimum feature size, the technology node will dictate the amount of required active silicon for the display CMOS based on the transistor size. As the node minimum feature size decreases, whether it be through alternate foundries or improvements in technology, the same need for maximizing transparency applies. Indeed, the benefit to removing non-active silicon islands improves as the ratio of inactive- to active-silicon increases with smaller transistors.

The example numbers described herein are derived assuming a 180 nm technology/process node, although similar calculations can be performed for any specific technology size.

Note that the non-active silicon islands included in the structure are included to provide mechanical structure. However, once the cover glass has been attached, that additional structure is no longer needed. Thus, the non-active silicon islands can be removed, and appropriate structure can still be maintained using the cover glass.

Some embodiments may be implemented where the stacked device and the underlying device have similar and/or widely overlapping spectrums, but where the underlying device and stacked device are implemented using different technologies. Thus, for example, in one embodiment the underlying device 102 may be an image intensifier tube base device sensitive to light in the visible spectrum while the stacked device is a CCD device which is also sensitive to light in the visible spectrum. This can be useful for a number of different purposes. For example, in one embodiment, this could be used to provide it enhanced detail in images output from composite device 100. Alternatively or in addition, this could be done to provide a measure of intensification performed by the intensifier input. In particular, input to a CCD based stacked device 104 could be compared to output from the intensifier tube based 102 over time to determine how different visible light inputs are handled by the underlying device 102. In this way, embodiments could be implemented to measure the gain of the underlying device 102.

As illustrated above, some embodiments may implement a checkerboard pattern of circuit elements in the stacked device where the checkerboard is formed by trenches between different circuit elements of the same type. For example, the circuit elements may be photodiodes in a collector layer in a first plane. The photodiodes in the collector plane are separated by trenches between the photodiodes. A corresponding emitter layer is in a second plane that is parallel to the first plane. The emitter layer includes light emitting diodes that correspond to the photodiodes in the collector plane. Further, the light emitting diodes in the emitter plane correspond positionally to photodiodes in the collector plane. Thus, a particular photodiode in the collector plane is coaxially positioned with a corresponding light emitting diode in the emitter plane. In some embodiments, coaxially corresponding photodiodes and light emitting diodes are coupled together such that a light emitting diode will emit light primarily (or in some embodiments exclusively) based on light absorbed by the corresponding photodiode coaxially located in the collector plane. In some embodiments, this can be used to create an accurate representation in the output of the underlying device 102 to positionally represent the location of a source of light in a second spectrum with respect to light occurring in a first spectrum. Thus, for example, the underlying device 102 can output an image based on light absorbed in the first spectrum. Light in the second spectrum can be used to create an overlay image such that sources of light in the second spectrum can be positionally compared with sources of light in the first spectrum.

Thus, generally embodiments can be implemented such that stacked devices overlap underlying devices so as to coaxially line up images from stacked devices with the underlying device.

In a more particular example, imagine a scenario where a human is emitting infrared light in an environment where visible light is being reflected or emitted by other objects in the environment. Embodiments illustrated herein could accurately show the location of the human with respect to the other objects in the environment.

Additionally, some embodiments may be configured to cause the output elements of the emitter layer (e.g., the light emitting diodes) to output a particular hue of light that can be distinguished from naturally occurring light in the first spectrum. Thus, in the example illustrated above, objects producing infrared light can be displayed differently on the output of the underlying device 102 then objects producing visible light detected natively by the underlying device 102. Thus, for example, embodiments can 'colorize' different spectrum light (e.g., SWIR vs visible/NIR) components by applying a filter array to an intensifier tube output and aligning it to associated input pixels.

Some embodiments illustrated herein can be implemented where the stacked device 104 comprises optical up-conversion elements such devices based on anti-Stokes shift principles and/or photonic amplifiers. The anti-Stokes shift refers to when a material absorbs light at one wavelength which causes a light emission from the material in a higher energy, lower wavelength. Previously, such systems were not suitable for use in night vision systems because they were limited by poor efficiency. However, these efficiency challenges can be solved by emitting the light into the downstream optical amplifier implemented by the underlying device 102.

In other embodiments, an optical laser pump and fiber optics can be used in a photonic amplifier to up-convert absorbed signals in a stacked device 104.

Some embodiments can implement additional functionality and exhibit additional benefits by exploiting spatial differences of a composite device for detecting different spectrums. In particular, where (spatially) light is emitted from an underlying device can be indicative of what spectrum the light belongs. For example, light output from the underlying device from a location corresponding to where a trench or other opening is located will be based on light absorbed in the primary spectrum. Light output from the underlying device in locations where no trenches or other openings exist is indicative of light being absorbed in the second spectrum and being up-converted. Embodiments can then process that information as appropriate. For example, with an image intensifier embodiment, color filters can be placed on different spatial portions of the output to differentiate sources of light. Alternatively, using a CMOS or other digital detector as the underlying device, different pixels can be identified as the primary spectrum or second spectrum based on spatial identification. Those pixels can then be assigned colors, as appropriate, at the output to allow for differentiation between different spectrums. This is, light in the primary spectrum may be output using a particular color or color palette while light in the second spectrum may be output using a different color or color palette.

As noted previously, embodiments are implemented to extend the spectrum sensitivity of night vision devices. To that end, various combinations of underlying devices and stacked devices may be implemented. In the examples illustrated above, the underlying device typically has sensitivity in the visible and/or Sub-NIR (<900 nm) spectrum(s). The examples illustrated above illustrate that this can be accomplished by, for example, using image intensifier technology, CMOS technology, or other technology.

In some such embodiments, various different spectrum devices can be implemented for one or more stacked devices. For example, in some embodiments, a stacked device may be designed for 1550 nm wavelengths. This wavelength is particularly useful as it represents a wavelength suitable for eye-safe lasers for manufacturing long-range rangefinders and/or laser guidance and laser painting systems.

Alternatively or additionally, embodiments may implement stacked devices having a spectrum specifically designed for 1064 nm lasers. These lasers can be used for medical purposes to remove lesions and tumors. Alternatively, these lasers can be used for cutting and/or etching. These lasers can be used for flow visualizations. These lasers can be used for laser rangefinders and/or laser guidance and laser painting systems.

Alternatively or additionally, embodiments may implement stacked devices having a NIR spectrum of 900-1700 nm. This spectrum can be useful for observation of celestial bodies.

Alternatively or additionally, embodiments may implement stacked devices having a spectrum of 1.7 to 3 um. This is one spectrum that has been referred to as SWIR. Note that this is a useful spectrum and represents the limit of systems that can use glass optics as glass optics become nonfunctional above 3 um.

Alternatively or additionally, embodiments may implement stacked devices having a spectrum of 3 to 5 um, which is considered MWIR. These devices are useful for seeing in occluded environments, such as environments having significant dust, cloud cover, or other occlusions. Additionally, this is a range that certain objects emit heat, such that heat of objects can be detected.

Alternatively or additionally, embodiments may implement stacked devices having a LWIR spectrum of 8-12 um. This is typically where organic infrared emissions occur. Thus, detectors of this spectrum can be used to detect humans, animals, and the like.

Note that embodiments can be implemented where multiple different spectrums can be implemented. Examples of this are illustrated in FIGS. 2 and 3.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A night-vision optical device comprising:
an underlying detector sensitive to a first spectrum and configured to provide output based on absorbing light in the first spectrum; and
a semiconductor stacked device disposed in an overlapping relationship with the underlying detector, the semiconductor stacked device comprising:
a collector layer including a two-dimensional array of photodiodes sensitive to a second spectrum,
an emitter layer including a two-dimensional array of light emitters that emit in the first spectrum,
a transport layer that electrically couples, on a one-to-one positional correspondence, individual photodiodes in the collector layer to coaxially aligned corresponding light emitters in the emitter layer, and
transparent regions formed as trenches through at least one of the collector layer, the transport layer, and the emitter layer, the transparent regions being transmissive to the first spectrum to transmit ambient first-spectrum light directly to the underlying detector,
wherein the semiconductor stacked device is configured to:
generate, from light in the second spectrum, electrical carriers in the collector layer and drive the coaxially aligned light emitters to emit in the first spectrum toward the underlying detector, and
permit concurrent transmission of ambient first-spectrum light through the trenches, such that the underlying detector receives in a single focal plane first-spectrum light corresponding to both ambient first-spectrum light and up-converted second-spectrum light with spatial registration preserved by the coaxial correspondence.

2. The device of claim 1, further comprising an optical coupling layer between the stacked device and the underlying detector, the optical coupling layer including a fiber-optic substrate and a fiber-optic faceplate bonded using index-matching adhesives, the optical coupling layer being configured to position output from the stacked device and input to the detector in a common image plane.

3. The device of claim 2, wherein the optical coupling layer comprises a lenslet array and/or planar optics in combination with the fiber-optic substrate.

4. The device of claim 1, wherein the emitter layer comprises OLED emitters emitting within 700-800 nm and the underlying detector comprises a GaAs photocathode image intensifier responsive in that band.

5. The device of claim 1, wherein the transport layer comprises controllable amplifier circuitry to adjust current delivered to the light emitters thereby controlling a ratio between ambient first-spectrum contribution and up-converted contribution.

6. The device of claim 1, wherein the collector layer comprises at least one of metamaterial plasmonic arrays, III-V, II-VI, or IV semiconductor photodiodes, graphene, or organic photodiodes.

7. The device of claim 6, wherein the at least one of the metamaterial plasmonic arrays, III-V, II-VI, or IV semiconductor photodiodes, graphene, or organic photodiodes are reverse-biased.

8. The device of claim 1, wherein the trenches are arranged in a checkerboard pattern defining sub-pixels such that each emitter is coaxially aligned with a corresponding photodiode across parallel planes.

9. A method of operating a composite night-vision device comprising an underlying detector sensitive to a first spectrum and an overlapping stacked device as in claim 1, the method comprising:

identifying, in an output image from the underlying detector, first pixels that are spatially aligned with the trenches and second pixels that are spatially aligned with regions lacking trenches;

rendering the first pixels using a first color palette associated with ambient first-spectrum light and rendering the second pixels using a second color palette associated with up-converted second-spectrum light; and outputting a colorized image in which contributions from different spectrums are distinguished by hue while remaining spatially co-registered.

10. The method of claim 9, further comprising assigning the second color palette to indicate SWIR (900-1700 nm), MWIR (3-5 µm), or LWIR (8-12 µm) origin depending on the sensitivity of the stacked device.

11. A composite device comprising:

an underlying detector sensitive to a first spectrum;

a first stacked device as in claim 1, the first stacked device sensitive to a second spectrum; and a second stacked device disposed over the first stacked device, the second stacked device being sensitive to a third spectrum, the second stacked device including transparent regions transmissive to the second spectrum such that third-spectrum light is up-converted by the second stacked device to second-spectrum light that passes through the transparent regions of the second stacked device and is received by the first stacked device for further up-conversion to the first spectrum, wherein the underlying detector forms a single-plane image comprising ambient first-spectrum light and up-converted light originating from the second and third spectrums.

12. The composite device of claim 11, wherein the second stacked device up-converts third-spectrum 1.7-3.0 µm signals into second-spectrum 900-1700 nm, and the first stacked device up-converts the second-spectrum into the first spectrum detectable by the underlying detector.

13. A method of manufacturing a stacked device for use with an underlying detector sensitive to a first spectrum, the method comprising:

forming, in a semiconductor stack that includes a collector layer, a transport layer, and an emitter layer, active silicon islands for drive/control circuitry of the emitter layer;

removing non-active silicon islands between the active silicon islands to form trenches that are transparent to the first spectrum; and selecting a pixel pitch such that the removal yields a stack transparency of at least 60% at a pitch of about 22.5 µm, or at least 75% at a pitch of about 36 µm, or at least 50% at a pitch of about 17.5 µm, wherein ambient first-spectrum light passes through the trenches to the underlying detector while up-converted first-spectrum light from the emitter layer is simultaneously delivered to the underlying detector.

14. The method of claim 13 wherein the trenches are produced by a backside etch through silicon to buried oxide followed by a transparent backfill that preserves mechanical integrity while remaining transmissive to the first spectrum.

\* \* \* \* \*